US012616189B2

(12) United States Patent
Bruns

(10) Patent No.: US 12,616,189 B2
(45) Date of Patent: May 5, 2026

(54) GAME DECOY SYSTEM

(71) Applicant: DAM DECOY COMPANY, Overland Park, KS (US)

(72) Inventor: Brian A. Bruns, Overland Park, KS (US)

(73) Assignee: DAM Decoy Company, Overland Park, KS (US)

( * ) Notice: Subject to any disclaimer, the term of this patent is extended or adjusted under 35 U.S.C. 154(b) by 118 days.

(21) Appl. No.: 18/543,256

(22) Filed: Dec. 18, 2023

(65) Prior Publication Data

US 2024/0114892 A1 Apr. 11, 2024

Related U.S. Application Data

(63) Continuation-in-part of application No. 17/582,680, filed on Jan. 24, 2022, now abandoned.

(51) Int. Cl.
*A01M 31/06* (2006.01)

(52) U.S. Cl.
CPC .................................. *A01M 31/06* (2013.01)

(58) Field of Classification Search
CPC ..................................................... A01M 31/06
USPC .......................................................... 43/3, 2
See application file for complete search history.

(56) References Cited

U.S. PATENT DOCUMENTS

| | | | | |
|---|---|---|---|---|
| 3,689,927 | A * | 9/1972 | Boston ................... | A01M 31/06 |
| | | | | 213/3 |
| 4,322,908 | A * | 4/1982 | McCrory ............. | A01M 31/06 |
| | | | | 43/3 |
| 4,612,722 | A * | 9/1986 | Ferrell ................... | A01M 31/06 |
| | | | | 43/26.1 |
| 6,553,709 | B1 * | 4/2003 | Owen ................... | A01M 31/06 |
| | | | | 446/153 |
| 8,146,285 | B1 * | 4/2012 | Jones .................... | A01M 31/06 |
| | | | | 43/2 |
| 10,292,380 | B1 * | 5/2019 | DeLoach, III ........ | H04W 4/024 |
| 10,321,674 | B1 * | 6/2019 | Goodwin .............. | A01M 31/06 |
| 10,935,971 | B2 * | 3/2021 | DeLoach, III ............ | H02J 7/00 |
| 11,191,262 | B2 * | 12/2021 | Priest ..................... | A01M 31/06 |
| 11,224,214 | B2 * | 1/2022 | Hanson .................. | A01M 31/06 |
| 11,304,415 | B2 * | 4/2022 | Herrington ............. | H04W 4/80 |
| 11,497,205 | B1 * | 11/2022 | Adams ................... | A01M 31/06 |
| 12,063,927 | B2 * | 8/2024 | Priest .................... | A01M 31/06 |
| 2003/0061754 | A1 * | 4/2003 | Cicoff ................... | A01M 31/06 |
| | | | | 43/2 |

(Continued)

FOREIGN PATENT DOCUMENTS

| | | | | |
|---|---|---|---|---|
| CN | 214677351 U | * | 11/2021 | |
| CN | 217217969 U | * | 8/2022 | |

*Primary Examiner* — Darren W Ark

(74) *Attorney, Agent, or Firm* — HOVEY WILLIAMS LLP

(57) ABSTRACT

A game decoy system comprising a remote controller and a game decoy. The remote controller includes a communication element configured to transmit a wireless signal representing an input. The game decoy includes a body, a propulsion mechanism, a communication element, and a controller. The body has a shape resembling a game animal. The propulsion mechanism is configured to propel the game decoy. The communication element is configured to receive the wireless signal from the remote controller. The controller is configured to instruct the propulsion mechanism to propel the game decoy according to the input.

10 Claims, 6 Drawing Sheets

(56) References Cited

U.S. PATENT DOCUMENTS

| | | | |
|---|---|---|---|
| 2009/0188148 A1* | 7/2009 | Orris ..................... | A01M 31/06 |
| | | | 43/2 |
| 2016/0205921 A1* | 7/2016 | Janzen, Jr. ............ | A01M 31/06 |
| 2019/0250602 A1* | 8/2019 | DeLoach, III ........ | H02J 7/0042 |
| 2020/0022360 A1* | 1/2020 | Priest ................... | A01M 31/06 |
| 2020/0146279 A1* | 5/2020 | Young .................. | A01M 31/06 |
| 2021/0141379 A1* | 5/2021 | DeLoach, III ......... | G08C 17/02 |
| 2022/0061309 A1* | 3/2022 | Priest ................... | A01M 31/06 |
| 2023/0232819 A1* | 7/2023 | Bruns ................... | A01M 31/06 |
| | | | 43/3 |
| 2025/0306595 A1* | 10/2025 | Wells ..................... | H01Q 1/34 |

* cited by examiner

GAME DECOY SYSTEM

RELATED APPLICATIONS

The present application is a continuation-in-part (CIP) patent application and claims priority benefit with regard to all common subject matter of U.S. patent application Ser. No. 17/582,680, titled "GAME DECOY SYSTEM", filed Jan. 24, 2022. The contents of application Ser. No. 17/582,680 are hereby incorporated by reference in its entirety.

BACKGROUND

Game decoys are used to lure game animals via visual resemblance, movement, and aural cues. Some game decoys move by themselves such as on a swivel or powered by wind, but their motion is not very convincing. Other game decoys provide more realistic movement but they require a user to pull a jerk cord or provide other physical input. This must be performed frequently or for a long time and may cause fatigue or otherwise is monotonous and not enjoyable.

SUMMARY

Embodiments of the present invention solve the above-mentioned problems and other problems and provide a distinct advancement in the art of game decoys. More particularly, the invention provides a game decoy system that more behaves more realistically with less user effort.

An embodiment of the invention is a game decoy system broadly comprising a game decoy and a remote controller.

The game decoy broadly comprises a body, a controller, a memory, a sensor, a communication element, and a propulsion mechanism.

The body is shaped to resemble a game animal. To that end, the body is molded or formed accordingly and may include colorations, markings, or other features suggesting the game animal.

The controller may comprise one or more processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The controller may also include or be in communication with a global positioning system (GPS) module configured to receive a GPS signal from which GPS coordinates can be obtained or derived.

The memory is embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof.

The sensor is communicatively coupled with the controller and is configured to detect obstacles, dead-ends, outer boundaries, and the like. The sensor may be a proximity sensor, a motion sensor, a visible light sensor, an infrared sensor, and a limit switch (i.e., a mechanical component that closes a portion of an electrical circuit when contacting an obstacle).

The communication element allows communication between the controller and the remote controller and may include a signal or data transmitting and receiving circuit or component such as an antenna, amplifier, filter, mixer, oscillator, digital signal processor (DSP), and the like.

The propulsion mechanism is configured to propel the game decoy on or in a body of water, on land, or in air. To that end, the propulsion mechanism includes a water propeller, a paddle, a water jet, a fin, an air propeller, a rotor, an airfoil, a set of wheels, a set of tracks, or the like, an electric motor or other drive mechanism, and a battery, solar panel, or other power component. The propulsion mechanism may also include a steering component such as a rudder. Additionally or alternatively, multiple propulsion mechanisms may be used for differential steering.

The remote controller broadly comprises a processor, a memory, a communication element, and an interface. The remote controller may be a cell phone, tablet, personal digital assistant (PDA), or other mobile device, a laptop computer, a videogame-style controller or joystick, a remote control "RC" car or airplane style controller, a television remote-style controller, a wand, or any other suitable remote controller.

The processor may comprise one or more processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processor may generally execute, process, or run instructions, code, code segments, code statements, software, firmware, programs, applications, apps, processes, services, daemons, or the like. The processor is configured to wirelessly communicate with the controller of the game decoy via the communication elements.

The memory is similar to the memory described above and is embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof.

The communication element is similar to the communication element described above and allows communication between the processor and the controller of the game decoy. The communication element may include a signal or data transmitting and receiving circuit or component such as an antenna, amplifier, filter, mixer, oscillator, digital signal processor (DSP), and the like.

The interface allows a user to provide commands to the remote controller to be communicated to the game decoy via an input or inputs. Inputs may include buttons, knobs, sliders, dials, directional pads, switches, keypads, keyboards, mice, joysticks, microphones, accelerometers, or the like, or combinations thereof. The interface may also comprise a touchscreen configured to emulate the above inputs. The interface may generate outputs associated with the commands and representing other data, information, notifications, or the like, via a display, the aforementioned touchscreen, audio speakers, lights, dials, meters, printers, or the like, or combinations thereof.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
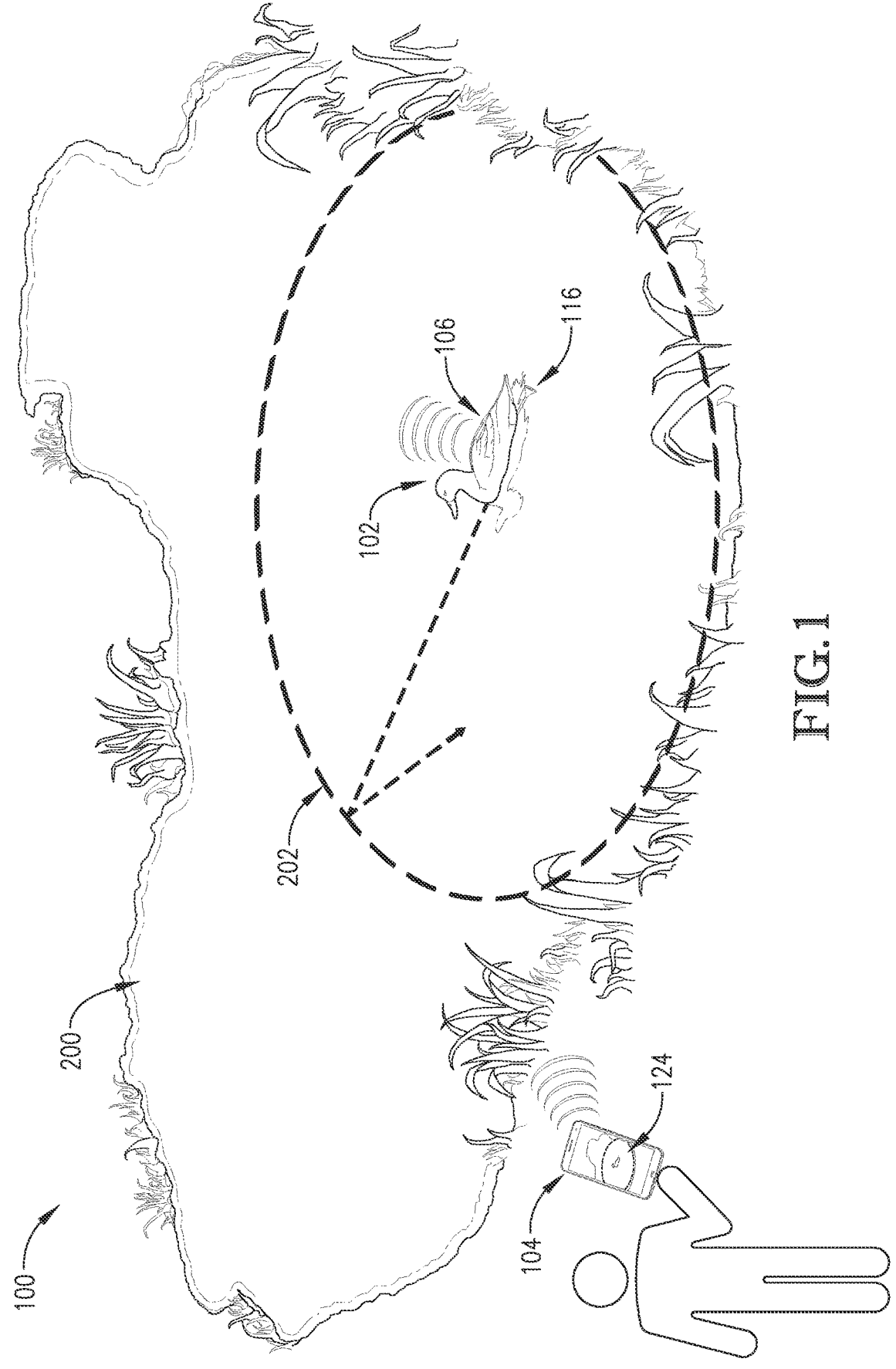
FIG. 1 is an environmental view of a game decoy system constructed in accordance with an embodiment of the invention.
Figures 2, 4:
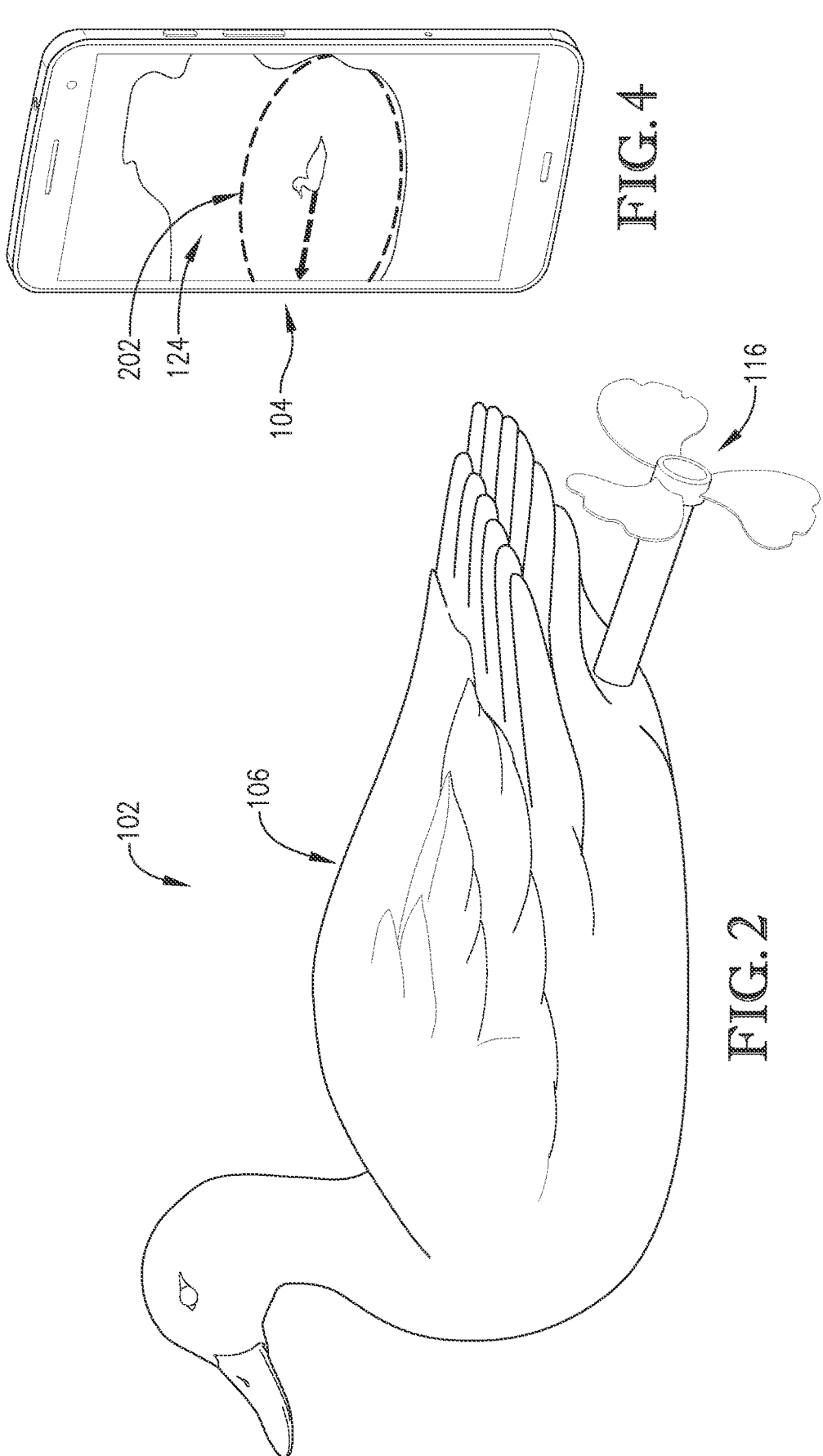
FIG. 2 is an enlarged perspective view of a game decoy of the game decoy system of FIG. 1.
FIG. 4 is an enlarged perspective view of a remote controller of the game decoy system of FIG. 1.
Figures 3, 5:
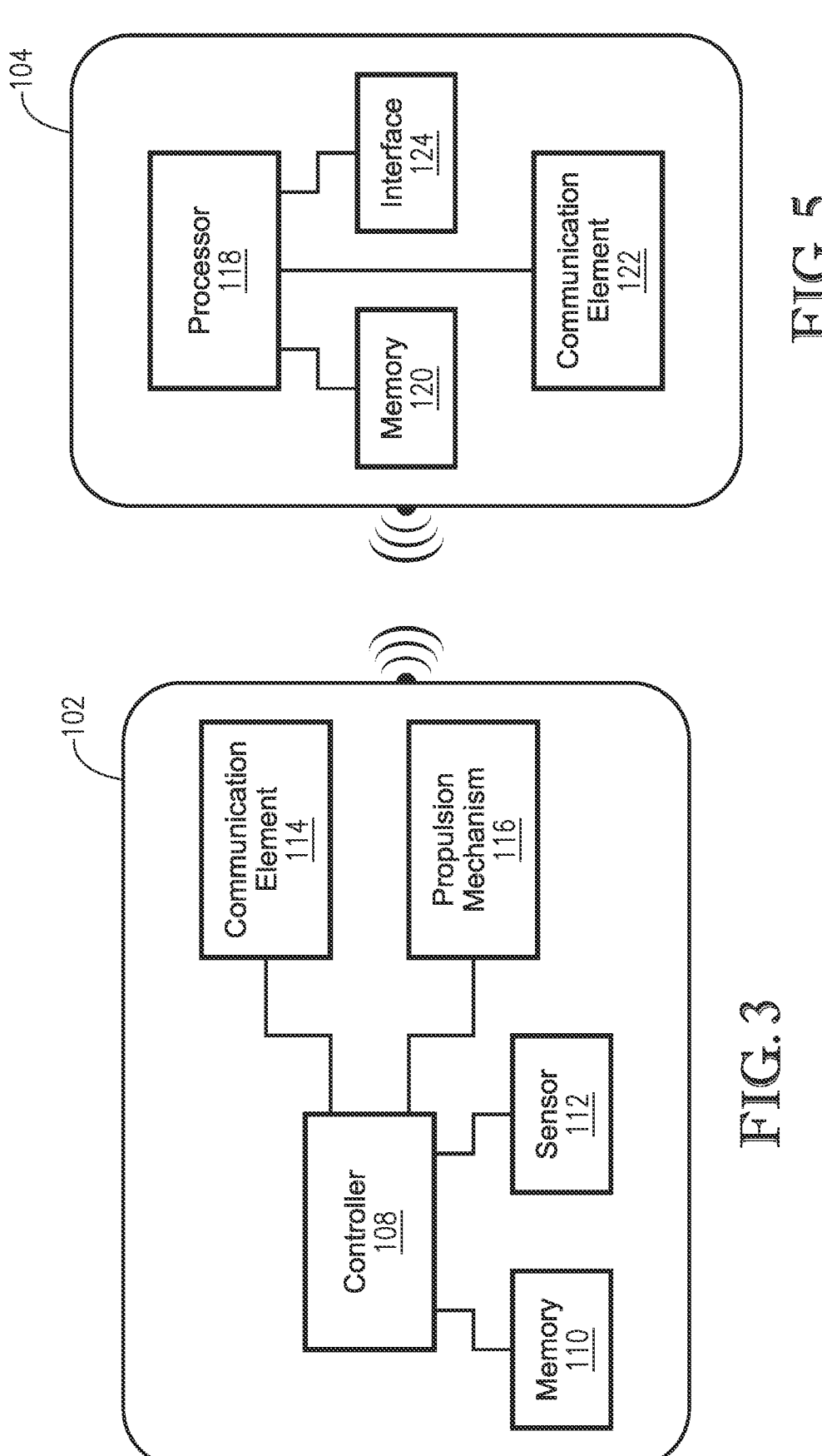
FIG. 3 is a schematic diagram of certain components of the game decoy of FIG. 2.
FIG. 5 is a schematic diagram of certain components of the remote controller of FIG. 4.
Figure 6:
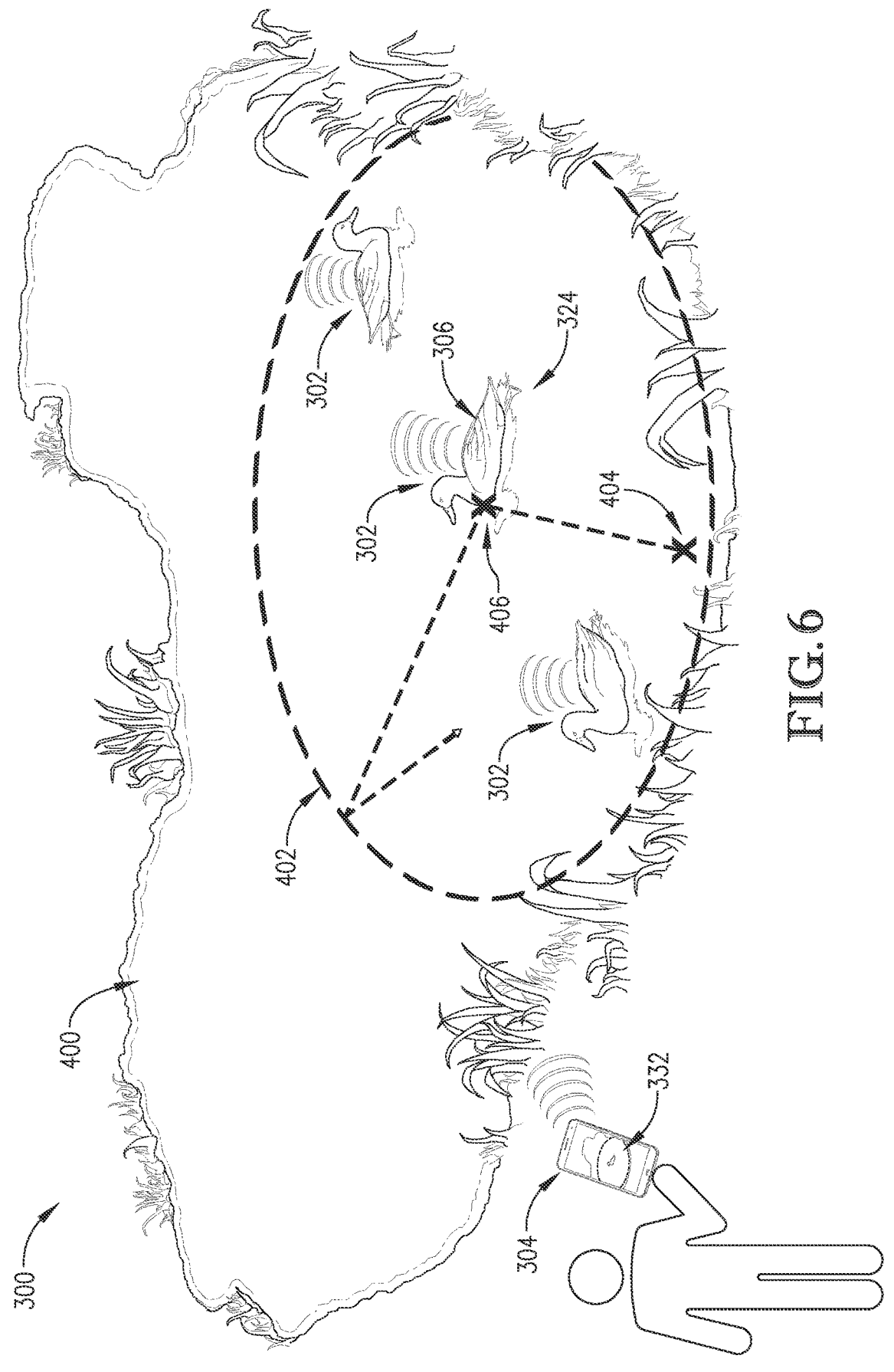
FIG. 6 is an environmental view of a game decoy system constructed in accordance with another embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Turning to FIGS. 1-5, a game decoy system 100 constructed in accordance with various embodiments of the invention is illustrated. The game decoy system 100 broadly comprises a game decoy 102 and a remote controller 104.

The game decoy 102 broadly comprises a body 106, a controller 108, a memory 110, a sensor 112, a communication element 114, and a propulsion mechanism 116.

The body 106 may be shaped to resemble a game animal such as a bird including waterfowl such as a duck, land-based animal, marine animal, amphibian, swimming land-based animal, or the like. The shape may be sufficiently realistic for a corresponding animal to be attracted either to the game decoy 102 itself or to the game decoy's surroundings by virtue of the game decoy 102. To that end, the body 106 may be molded or formed accordingly and may include colorations, markings, or other features suggesting the game animal. The body 106 may be made of buoyant material so that the game decoy 102 is configured to float on water.

The controller 108 may comprise one or more processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 108 may generally execute, process, or run instructions, code, code segments, code statements, software, firmware, programs, applications, apps, processes, services, daemons, or the like. The controller 108 may also include hardware components such as registers, finite-state machines, sequential and combinational logic, configurable logic blocks, and other electronic circuits that can perform the functions necessary for the operation of the current invention. In certain embodiments, the controller 108 may include multiple computational components and functional blocks that are packaged separately but function as a single unit. The controller 108 may be in electronic communication with other electronic components through serial or parallel links that include universal busses, address busses, data busses, control lines, and the like. The controller 108 may also include or be in communication with a global positioning system (GPS) module configured to receive a GPS signal from which GPS coordinates can be obtained or derived.

The memory 110 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory 110 may be embedded in, or packaged in the same package as, the controller 108. The memory 110 may include, or may constitute, a non-transitory "computer-readable medium". The memory may store the instructions, code, code statements, code segments, software, firmware, programs, applications, apps, services, daemons, or the like that are executed by the controller 108. The memory 110 may also store data that is received by the controller 108 or the device in which the controller 108 is implemented. The memory 110 may further store data or intermediate results generated during processing, calculations, and/or computations as well as data or final results after processing, calculations, and/or computations. In addition, the memory 110 may store settings, data, documents, sound files, photographs, videos, images, databases, and the like.

The sensor 112 detects obstacles, dead-ends, outer boundaries, and the like. The sensor 112 may be a proximity sensor, a motion sensor, a visible light sensor, an infrared sensor, and a limit switch (i.e., a mechanical component that closes a portion of an electrical circuit when contacting an obstacle).

The communication element 114 may generally allow communication between the controller 108 and the remote controller 104 and may include a signal or data transmitting and receiving circuit or component such as an antenna, amplifier, filter, mixer, oscillator, digital signal processor (DSP), and the like. The communication element 114 may establish communication wirelessly by utilizing RF signals, infrared signals, near field communication (NFC), and/or data that comply with communication standards such as cellular 2G, 3G, 4G, 5G, or LTE, WiFi, WiMAX, Bluetooth®, BLE, or combinations thereof.

The propulsion mechanism 116 may be configured to propel the game decoy 102 on or in a body of water (e.g., body of water 200), on land, or in air. To that end, the propulsion mechanism 116 may include a water propeller, a paddle, a water jet, a fin, an air propeller, a rotor, an airfoil, a set of wheels, a set of tracks, or the like, an electric motor or other drive mechanism, and a battery, solar panel, or other power component. The propulsion mechanism 116 may also include a steering component such as a rudder. Additionally or alternatively, multiple propulsion mechanisms may be used for differential steering.

The remote controller 104 broadly comprises a processor 118, a memory 120, a communication element 122, and an interface 124. The remote controller 104 may be a cell phone, tablet, personal digital assistant (PDA), or other mobile device, a laptop computer, a videogame-style controller or joystick, a remote control "RC" car or airplane style controller, a television remote-style controller, a wand, or any other suitable remote controller.

The processor 118 may comprise one or more processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processor 118 may generally execute, process, or run instructions, code, code segments, code statements, software, firmware, programs, applications, apps, processes, services, daemons, or the like. The processor 118 may also include hardware components such as registers, finite-state machines, sequential and combinational logic, configurable logic blocks, and other electronic circuits that can perform the functions necessary for the operation of the current invention. In certain embodiments, the processor 118 may include multiple computational components and functional blocks that are packaged separately but function as a single unit. The processor 118 may be in electronic communication with other electronic components through serial or parallel links that include universal busses, address busses, data busses, control lines, and the like.

The memory 120 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory 120 may be embedded in, or packaged in the same package as, the processor 118. The memory 120 may include, or may constitute, a non-transitory "computer-readable medium". The memory may store the instructions, code, code statements, code segments, software, firmware, programs, applications, apps, services, daemons, or the like that are executed by the processor 118. The memory 120 may also store data that is received by the processor 118 or the device in which the processor 118 is implemented. The memory 120 may further store data or intermediate results generated during processing, calculations, and/or computations as well as data or final results after processing, calculations, and/or computations. In addition, the memory 120 may store settings, data, documents, sound files, photographs, videos, images, databases, and the like.

The communication element 122 may generally allow communication between the processor 118 and the game decoy 102 and may include a signal or data transmitting and receiving circuit or component such as an antenna, amplifier, filter, mixer, oscillator, digital signal processor (DSP), and the like. The communication element 122 may establish communication wirelessly by utilizing RF signals, infrared signals, near field communication (NFC), and/or data that comply with communication standards such as cellular 2G, 3G, 4G, 5G, or LTE, WiFi, WiMAX, Bluetooth®, BLE, or combinations thereof.

The interface 124 generally allow a user to provide commands to the remote controller 104 to be communicated to the game decoy 102 via an input or inputs. Inputs may include buttons, knobs, sliders, dials, directional pads, switches, keypads, keyboards, mice, joysticks, microphones, accelerometers, or the like, or combinations thereof. The interface 124 may also comprise a touchscreen configured to emulate the above inputs. The interface 124 may generate outputs associated with the commands and representing other data, information, notifications, or the like, via a display, the aforementioned touchscreen, audio speakers, lights, dials, meters, printers, or the like, or combinations thereof.

The interface 124 may display a visual representation of the game decoy 102 and its surrounding area. The interface 124 may also display markings or symbols representing commands, routines, and desired areas (such as desired area 202). For example, the interface 124 may display satellite imagery representing the body of water 200, a duck representing a position of the game decoy 102 in the body of water 200, a circle representing desired area 202 in which the game decoy 102 should remain, and a number of lines representing a path the game decoy 102 will follow according to a selected routine.

In use, the game decoy 102 may be pre-loaded with inputs, routines, data, operating parameters, settings, programs, initial operating states, and the like. The game decoy 102 may then be placed in the body of water 200 or other area in which it is desired to attract certain game animals. The game decoy 102 may then initially follow the pre-loaded inputs, routines, data, operating parameters, settings, or programs. For example, a user may turn the game decoy 102 on and place the game decoy 102 in the body of water 200, upon which the game decoy 102 may move according to a basic routine such as "move forward, and upon encountering an obstacle or reaching the edge of a desired area 202, make a preset turn, and repeat". Alternatively, the game decoy 102 may await initial instructions.

The user may then provide a command to the remote controller 104, which is then transmitted to the game decoy 102. The game decoy 102 may then follow the command. The command may be an instruction to perform a temporary action, and upon its completion the game decoy 102 resumes its current routine. The command may also be a modification of the current routine, or a selection of a routine. The game decoy 102 may also not be following a routine and may only commands. The user may also provide routines, desired areas in which the game decoy 102 should remain, or temporary actions such as shake or dip (mimicking duck behavior) or make a sound (e.g., a honk or quack).

The game decoy 102 may perform actions and routines, and follow commands subject to other considerations such as encountering an obstacle or edge of the desired area 202. For example, the game decoy 102 may follow a command to move forward, which it will follow except if it encounters an obstacle or the edge of the desired area 202, the game decoy 102 may follow a routine (including routines provided by the user for such situations) such as "make a preset turn" and then resume following the command.

Turning to FIGS. 6-10, a game decoy system 300 constructed in accordance with other embodiments of the invention is illustrated. The game decoy system 300 broadly comprises a plurality of game decoys 302 and a remote controller 304. The game decoys 302 may be substantially similar to each other and thus only one game decoy 302 will be described in more detail.

Figures 7, 9:
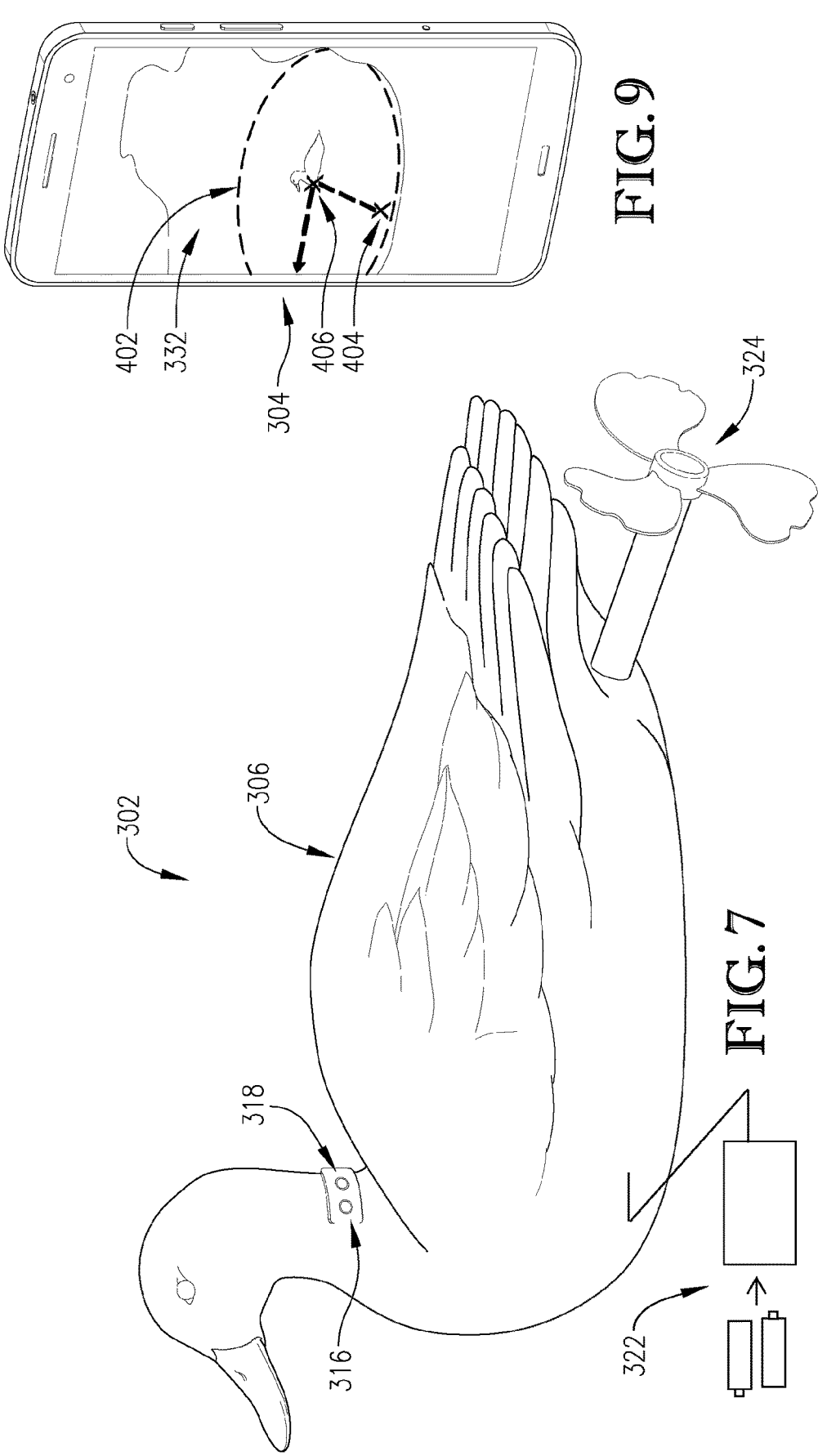
FIG. 7 is an enlarged perspective view of a game decoy of the game decoy system of FIG. 6.
FIG. 9 is an enlarged perspective view of a remote controller of the game decoy system of FIG. 6.
Figures 8, 10:
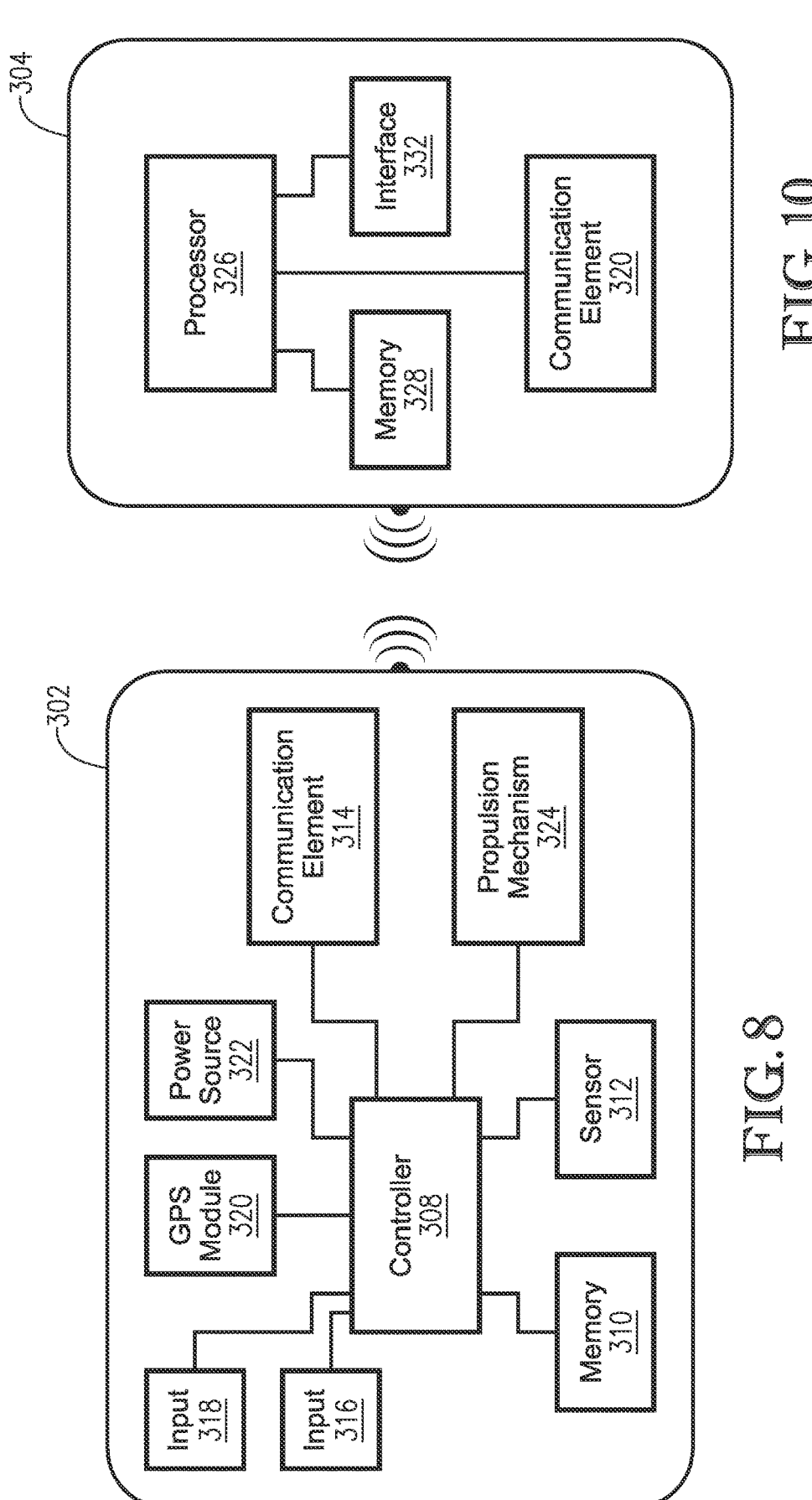
FIG. 8 is a schematic diagram of certain components of the game decoy of FIG. 7.
FIG. 10 is a schematic diagram of certain components of the remote controller of FIG. 9.

As best seen in FIGS. 7 and 8, the game decoy 302 broadly comprises a body 306, a controller 308, a memory 310, a sensor 312, a communication element 314, a first input 316, a second input 318, a global positioning system (GPS) module 320, a power source 322, and a propulsion mechanism 324.

The body 306 may be shaped to resemble a game animal such as a bird including waterfowl such as a duck, land-based animal, marine animal, amphibian, swimming land-based animal, or the like. The shape may be sufficiently realistic for a corresponding animal to be attracted either to the game decoy 302 itself or to the game decoy's surroundings by virtue of the game decoy 302. To that end, the body 306 may be molded or formed accordingly and may include colorations, markings, or other features suggesting the game animal. The body 306 may be made of buoyant material so that the game decoy 302 is configured to float on water.

The controller 308 may comprise one or more processors, microprocessors (single-core or multi-core), microcontrollers, digital signal processors (DSPs), printed circuit boards, field-programmable gate arrays (FPGAs), analog and/or digital application-specific integrated circuits (ASICs), or the like, or combinations thereof. The controller 308 may generally execute, process, or run instructions, code, code segments, code statements, software, firmware, programs, applications, apps, processes, services, daemons, or the like. The controller 308 may also include hardware components such as registers, finite-state machines, sequential and combinational logic, configurable logic blocks, and other electronic circuits that can perform the functions necessary for the operation of the current invention. In certain embodiments, the controller 308 may include multiple computational components and functional blocks that are packaged separately but function as a single unit. The controller 308 may be in electronic communication with other electronic components through serial or parallel links that include universal busses, address busses, data busses, control lines, and the like. The controller 308 may also include or be in communication with the GPS module 320 described below and for receiving a GPS signal from which GPS coordinates can be obtained or derived. The controller 308 may also include or be in communication with a magnetometer, an accelerometer, and/or a compass for navigation.

The memory 310 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory 310 may be embedded in, or packaged in the same package as, the controller 308. The memory 310 may include, or may constitute, a non-transitory "computer-readable medium".

The memory may store the instructions, code, code statements, code segments, software, firmware, programs, applications, apps, services, daemons, or the like that are executed by the controller 308. The memory 310 may also store data that is received by the controller 308 or the device in which the controller 308 is implemented. The memory 310 may further store data or intermediate results generated during processing, calculations, and/or computations as well as data or final results after processing, calculations, and/or computations. In addition, the memory 310 may store settings, data, documents, sound files, photographs, videos, images, databases, and the like.

The sensor 312 detects obstacles, dead-ends, outer boundaries, and the like. The sensor 312 may be a proximity sensor, a motion sensor, a visible light sensor, an infrared sensor, distance sensor, a limit switch (i.e., a mechanical component that closes a portion of an electrical circuit when contacting an obstacle), and the like.

The communication element 314 may generally allow communication between the controller 308 and the remote controller 304 and may include a signal or data transmitting and receiving circuit or component such as an antenna, amplifier, filter, mixer, oscillator, digital signal processor (DSP), and the like. The communication element 314 may establish communication wirelessly by utilizing RF signals, infrared signals, near field communication (NFC), and/or data that comply with communication standards such as cellular 2G, 3G, 4G, 5G, or LTE, WiFi, WiMAX, Bluetooth®, BLE, or combinations thereof.

The first input 316 may be a push button, switch, or the like for establishing a low energy return point 404 based on a current GPS location of the game decoy 302. The low energy return point 404 may be the geographical point that the game decoy 302 will attempt to return to in the event an available energy level drops to a predetermined threshold such as a critically low level. The first input 316 may be on a left side of the body 306 or any other suitable location on the game decoy 302.

The second input 318 may be a push button, switch, or the like for establishing a travel center point 406 of the desired area 402 (or another point at least partially defining the desired area 402). The travel center point 406 may be considered a "home point", i.e., the geographical point located at the center of the region of operation (area 402). The second input 318 may also be used to select a desired radius of the desired area 402.

The GPS module 320 may be communicatively connected to the controller 308 and configured to send, to the controller 308, a signal from which GPS coordinates of the game decoy 302 can be obtained or derived. In this way, positions of the game decoy 302 can be determined.

The power source 322 may be a removable or unremovable battery pack, charge cartridge, or the like. For example, the power source 322 may include alkaline batteries, lithium-ion batteries, or the like. The power source 322 may also be rechargeable. In one embodiment, the power source 322 is a quadruple AA NiMH battery pack having a battery life of between approximately 5 and 8 hours. Furthermore, the power source may generate or wirelessly draw power (e.g., a solar panel or wireless power transfer).

The propulsion mechanism 324 may be configured to propel the game decoy 302 on or in a body of water (e.g., body of water 400), on land, or in air. To that end, the propulsion mechanism 324 may include a water propeller, a paddle, a water jet, a fin, an air propeller, a rotor, an airfoil, a set of wheels, a set of tracks, or the like, an electric motor or other drive mechanism, and a battery, solar panel, or other power component. The propulsion mechanism 324 may also include a steering component such as a rudder. Additionally or alternatively, multiple propulsion mechanisms may be used for differential steering.

The game decoy 302 may also include LEDs for indicating various states of the game decoy 302 such as energy level, mode, operation status (error, no errors, etc.). In one embodiment, the LEDs may include a red/green/blue (RGB) status LED and an LED info bar. The LEDs may be able to alert the user to various operating conditions (e.g., game decoy 302 is stuck, energy level is low, etc.) while the user is far from the game decoy 302.

Turning to FIGS. 9 and 10, the remote controller 304 broadly comprises a processor 326, a memory 328, a communication element 330, and an interface 332. The remote controller 304 may be a cell phone, tablet, personal digital assistant (PDA), or other mobile device, a laptop computer, a videogame-style controller or joystick, a remote control "RC" car or airplane style controller, a television remote-style controller, a wand, or any other suitable remote controller.

The processor 326 may comprise one or more processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processor 326 may generally execute, process, or run instructions, code, code segments, code statements, software, firmware, programs, applications, apps, processes, services, daemons, or the like. The processor 326 may also include hardware components such as registers, finite-state machines, sequential and combinational logic, configurable logic blocks, and other electronic circuits that can perform the functions necessary for the operation of the current invention. In certain embodiments, the processor 326 may include multiple computational components and functional blocks that are packaged separately but function as a single unit. The processor 326 may be in electronic communication with other electronic components through serial or parallel links that include universal busses, address busses, data busses, control lines, and the like.

The memory 328 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory 328 may be embedded in, or packaged in the same package as, the processor 326. The memory 328 may include, or may constitute, a non-transitory "computer-readable medium". The memory may store the instructions, code, code statements, code segments, software, firmware, programs, applications, apps, services, daemons, or the like that are executed by the processor 326. The memory 328 may also store data that is received by the processor 326 or the device in which the processor 326 is implemented. The memory 328 may further store data or intermediate results generated during processing, calculations, and/or computations as well as data or final results after processing, calculations, and/or computations. In addition, the memory 328 may store settings, data, documents, sound files, photographs, videos, images, databases, and the like.

The communication element 330 may generally allow communication between the processor 326 and the game decoy 302 and may include a signal or data transmitting and receiving circuit or component such as an antenna, amplifier, filter, mixer, oscillator, digital signal processor (DSP), and the like. The communication element 330 may establish communication wirelessly by utilizing RF signals, infrared signals, near field communication (NFC), and/or data that comply with communication standards such as cellular 2G, 3G, 4G, 5G, or LTE, WiFi, WiMAX, Bluetooth®, BLE, or combinations thereof.

The interface 332 generally allow a user to provide commands to the remote controller 304 to be communicated to the game decoy 302 via an input or inputs. Inputs may include buttons, knobs, sliders, dials, directional pads, switches, keypads, keyboards, mice, joysticks, microphones, accelerometers, or the like, or combinations thereof. The interface 332 may also comprise a touchscreen configured to emulate the above inputs. The interface 332 may generate outputs associated with the commands and representing other data, information, notifications, or the like, via a display, the aforementioned touchscreen, audio speakers, lights, dials, meters, printers, or the like, or combinations thereof.

The interface 332 may display a visual representation of the game decoy 302 and its surrounding area. The interface 332 may also display markings or symbols representing commands, routines, and desired areas (such as desired area 402). For example, the interface 332 may display satellite imagery representing the body of water 200, a duck representing a position of the game decoy 302 in the body of water 400, a circle representing desired area 402 in which the game decoy 302 should remain, and a number of lines representing a path the game decoy 302 will follow according to a selected routine.

In use, the game decoy 302 may be pre-loaded with inputs, routines, data, operating parameters, settings, programs, initial operating states, and the like. The game decoy 302 may then be placed in the body of water 400 or other area in which it is desired to attract certain game animals. One of the first input 316, second input 318, or another input may be activated to power on the game decoy 302 and begin to retrieve a GPS fix.

The first input 316 may then be pressed so that the controller 308 establishes a low energy return point 404 according to a current (when the first input 316 is activated) position of the game decoy 302 as determined from the GPS module 320. The second input 318 may then be pressed so that the controller 308 establishes a travel center point 406 according to a current (when the second input 318 is activated) position of the game decoy 302 as determined from the GPS module 320. The second input 318 may also be activated to select or change a desired radius of the desired area 402. In one embodiment, a small radius of 15 feet, a medium radius of 20 feet, and a large radius of 30 feet may be options. LEDs may flash or light up to indicate the low energy return point 404 or travel center point 406 has been updated.

The game decoy 302 may then initially follow the pre-loaded inputs, routines, data, operating parameters, settings, or programs. The game decoy 302 may then move according to a basic routine such as "move forward, and upon encountering an obstacle or reaching the edge of the desired area 402, make a preset turn, and repeat". Alternatively, the game decoy 302 may await initial instructions.

The user may then provide a command to the remote controller 304, which is then transmitted to the game decoy 302. The game decoy 302 may then follow the command. The command may be an instruction to perform a temporary action, and upon its completion the game decoy 302 resumes its current routine. The command may also be a modification of the current routine, or a selection of a routine. The game decoy 302 may also not be following a routine and may only commands. The user may also provide routines, desired areas in which the game decoy 302 should remain, or temporary actions such as shake or dip (mimicking duck behavior) or make a sound (e.g., a honk or quack).

The game decoy 302 may perform actions and routines, and follow commands subject to other considerations such as encountering an obstacle or edge of the desired area 402. For example, the game decoy 302 may follow a command to move forward, which it will follow except if it encounters an obstacle or the edge of the desired area 402, the game decoy 302 may follow a routine (including routines provided by the user for such situations) such as "make a preset turn" and then resume following the command. If the game decoy 302 detects that no forward progress has been made for an amount of time, the game decoy 302 may attempt to move in a reverse direction. If this fails to induce movement, the game decoy 302 may transmit a signal indicating the game decoy 302 is "in distress" and will cease operation.

The game decoy 302 may also move within the area 402 by choosing random headings to follow for at least a partially random first amount of time (e.g., move in a first direction for a first amount of time, then move in a second direction for a second amount of time). When the game decoy reaches an edge of the area 402, a new random heading at least partially toward the travel center point 406 (i.e., back into the area 402) may be followed. The result is semi-sporadic movement within the area 402.

The controller 308 of the game decoy 302 may instruct the propulsion mechanism 324 to propel the game decoy 302 at least partially based on the travel center point 406. The controller 308 may also instruct the propulsion mechanism 324 to propel the game decoy 302 to the low energy return point 404 when an energy level of the game decoy 302 drops to a predetermined threshold. If no low energy return point has been established, the game decoy 302 may instead be directed to the travel center point 406.

The controller 308 may also transmit a signal representing at least one of a status of the game decoy 302 and a current position of the game decoy 302. The controller 308 may also enter a manual override mode to receive a signal representing operating commands and instruct the propulsion mechanism 324 to propel the game decoy 302 according to the operating commands. The game decoy 302 may also wirelessly communicate with additional game decoys to coordinate movement therebetween. The controller 308 may also transmit a signal representative of a position of the game decoy 302 so that the game decoy 302 acts as a master decoy for other game decoys to follow or avoid. The game decoy 302 may be turned off by activating the first input 316, second input 318, and or other inputs in a predetermined pattern.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Patent claims stemming from this patent application are not intended to be construed under 35 U.S.C. § 114(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in any claims stemming from this application.

Having thus described various embodiments of the technology, patentable subject matter may include the following:

The invention claimed is:

1. A game decoy comprising:

a body having a shape resembling a game animal;

a propulsion mechanism for propelling the game decoy in or on a body of water; and a control system configured to determine positions of the game decoy, the control system including:

a controller configured to instruct the propulsion mechanism to propel the game decoy;

a first input communicatively connected to the controller so that the controller establishes a low energy return point according to a first position of the game decoy as determined by the control system when the first input is activated so that the controller instructs the propulsion mechanism to propel the game decoy to the low energy return point when an energy level of the game decoy drops to a predetermined threshold; and a second input communicatively connected to the controller so that the controller establishes a travel center point according to a second position of the game decoy as determined by the control system when the second input is activated so that the controller instructs the propulsion mechanism to propel the game decoy at least partially based on the travel center point, wherein the first input and the second input are push buttons on the body.

2. The game decoy of claim 1, wherein the control system further includes a global positioning system module communicatively connected to the controller for determining the positions of the game decoy.

3. The game decoy of claim 1, wherein the controller is configured to instruct the propulsion mechanism to propel the game decoy in at least a partially random first direction for at least a partially random first amount of time and subsequently to instruct the propulsion mechanism to propel the game decoy in at least a partially random second direction for at least a partially random second amount of time when the first amount of time has elapsed.

4. The game decoy of claim 1, wherein the controller is further configured to establish a travel radius centered on the travel center point according to an activation of the second input.

5. The game decoy of claim 1, wherein the control system is further configured to transmit a signal representing at least one of a status of the game decoy and a position of the game decoy.

6. The game decoy of claim 1, wherein the control system is further configured to enter a manual override mode in which the control system receives a signal representing operating commands and instructs the propulsion mechanism to propel the game decoy according to the operating commands.

7. The game decoy of claim 1, wherein the control system is further configured to wirelessly communicate with additional game decoys to coordinate movement of the game decoy and the additional game decoys.

8. The game decoy of claim 7, wherein the control system is further configured to transmit a signal representative of at least one of the positions of the game decoy as determined by the control system such that the game decoy is configured to act as a master decoy.

9. The game decoy of claim 1, further comprising a battery pack configured to receive replaceable batteries for powering the game decoy to provide the energy level of the game decoy.

10. A game decoy comprising:
a body having a shape resembling a game animal;
a propulsion mechanism for propelling the game decoy in or on a body of water; and
a control system including:
a controller configured to instruct the propulsion mechanism to propel the game decoy;
a GPS module communicatively connected to the controller for determining positions of the game decoy;
a first input communicatively connected to the controller so that the controller establishes a low energy return point according to a first position of the game decoy as determined by the control system when the first input is activated so that the controller instructs the propulsion mechanism to propel the game decoy to the low energy return point when an energy level of the game decoy drops to a predetermined threshold; and
a second input communicatively connected to the controller so that the controller establishes a travel center point according to a second position of the game decoy as determined by the control system when the second input is activated so that the controller instructs the propulsion mechanism to propel the game decoy at least partially based on the travel center point,
wherein the first input and the second input are push buttons on the body,
the controller being further configured to:
instruct the propulsion mechanism to propel the game decoy in at least a partially random first direction for at least a partially random first amount of time and subsequently to instruct the propulsion mechanism to propel the game decoy in at least a partially random second direction for at least a partially random second amount of time when the first amount of time has elapsed;
establish a travel radius centered on the travel center point according to an activation of the second input;
transmit a signal representing at least one of a status of the game decoy and a position of the game decoy;
enter a manual override mode in which the control system receives a signal representing operating commands and instructs the propulsion mechanism to propel the game decoy according to the operating commands; and
wirelessly communicate with additional game decoys to coordinate movement of the game decoy and the additional game decoys.

\* \* \* \* \*